(12) United States Patent
Mazloum et al.

(10) Patent No.: US 11,516,827 B2
(45) Date of Patent: Nov. 29, 2022

(54) METHODS FOR UPLINK DATA TRANSMISSION AND RELATED ELECTRONIC DEVICES

(71) Applicant: Sony Corporation, Tokyo (JP)

(72) Inventors: Nafiseh Mazloum, Lund (SE); Rickard Ljung, Helsingborg (SE); Basuki Priyanto, Lund (SE)

(73) Assignee: Sony Group Corporation, Tokyo (JP)

( * ) Notice: Subject to any disclaimer, the term of this patent is extended or adjusted under 35 U.S.C. 154(b) by 37 days.

(21) Appl. No.: 17/051,421

(22) PCT Filed: Apr. 5, 2019

(86) PCT No.: PCT/SE2019/050318
§ 371 (c)(1),
(2) Date: Oct. 28, 2020

(87) PCT Pub. No.: WO2019/216801
PCT Pub. Date: Nov. 14, 2019

(65) Prior Publication Data
US 2021/0227562 A1    Jul. 22, 2021

(30) Foreign Application Priority Data

May 9, 2018    (SE) .................................. 1800090-1

(51) Int. Cl.
*H04W 72/12*    (2009.01)
*H04L 1/08*    (2006.01)
(Continued)

(52) U.S. Cl.
CPC .......... *H04W 72/1268* (2013.01); *H04L 1/08* (2013.01); *H04W 52/0216* (2013.01); *H04W 72/14* (2013.01); *H04W 74/0833* (2013.01)

(58) Field of Classification Search
CPC ......... H04W 72/1268; H04W 52/0216; H04W 72/14; H04W 74/0833; H04W 72/1278; H04L 1/08; Y02D 30/70
(Continued)

(56) References Cited

U.S. PATENT DOCUMENTS

2015/0201456 A1*   7/2015   Lee ..................... H04W 72/042
                                                           370/311
2017/0034869 A1    2/2017   Vangala et al.
(Continued)

FOREIGN PATENT DOCUMENTS

EP    2282597 A    2/2011

OTHER PUBLICATIONS

International Search Report for corresponding International Application No. PCT/SE2019/050318, dated Jun. 13, 2019, 7 pages.
(Continued)

*Primary Examiner* — Hirdepal Singh
(74) *Attorney, Agent, or Firm* — Tucker Ellis LLP

(57) ABSTRACT

The present disclosure provides a method, performed by an electronic device, for an uplink data transmission. The electronic device is configured to communicate with a wireless communication network node. The method comprises transmitting a scheduling request for the uplink data transmission to the wireless communication network node. The method comprises receiving a signalling message from the wireless communication network node. The signalling message is indicative of a first time period during which the electronic device is not required to monitor a downlink control.

19 Claims, 11 Drawing Sheets

(51) Int. Cl.
  *H04W 52/02*   (2009.01)
  *H04W 72/14*   (2009.01)
  *H04W 74/08*   (2009.01)

(58) Field of Classification Search
  USPC .......................................................... 455/450
  See application file for complete search history.

(56) References Cited

U.S. PATENT DOCUMENTS

| | | | |
|---|---|---|---|
| 2017/0142749 A1 | 5/2017 | Kim et al. | |
| 2017/0202054 A1* | 7/2017 | Rathonyi | H04L 69/28 |
| 2018/0077749 A1 | 3/2018 | Yamada et al. | |
| 2018/0234992 A1* | 8/2018 | Shi | H04W 72/04 |
| 2019/0254059 A1* | 8/2019 | Gulati | H04W 72/1231 |
| 2019/0289621 A1* | 9/2019 | Li | H04W 72/0446 |
| 2019/0313332 A1* | 10/2019 | Wu | H04W 52/0219 |

OTHER PUBLICATIONS

Ericsson, "DRX in NR active mode", 3GPP TSG-RAN WG2 #95, R2-165329, Aug. 22-26, 2016, 5 pages.

Sony, "Adaptive power saving techniques based on UE power consumption characteristics", 3GPP TSG RAN WG1 Meeting #95, R1-1812749, Nov. 12-16, 2018, 5 pages.

Swedish Search Report for corresponding Swedish Application No. 1800090-1, dated Dec. 14, 2018, 8 pages.

Ericsson: "DRX Enhancements for NR", 3GPP Draft; R2-168662—DRX Enhancements for NR, 3rd Generation Partnership Project (3GPP), Mobile Competence Centre ; Nov. 14, 2016-Nov. 18, 2016; dated Nov. 13, 2016; XP051178218, Retrieved from the Internet: URL:http://www.3gpp org/ftp/Meetings_3GPP_SYNC/RAN2/Docs/; 4 pages.

ZTE: "Wake up signal function for NB-IoT", 3GPP Draft; R1-1804186 Wake up Signal Function for NB-Iot, 3rd Generation Partnership Project (3GPP), Mobile Competence Centre RAN WG1, dated Apr. 15, 2018, XP051426474, Retrieved from the Internet: URL:http://www.3gpp.org/ftp/Meetings%5F3G PP%5FSYNC/RAN 1 /Docs/; 5 pages.

* cited by examiner

METHODS FOR UPLINK DATA TRANSMISSION AND RELATED ELECTRONIC DEVICES

The present disclosure pertains to the field of wireless communications. More specifically, the present disclosure relates to methods for uplink data transmission and related electronic devices, methods for uplink scheduling and related wireless communication network nodes.

BACKGROUND

In 3rd generation project partnership (3GPP) systems, such as long-term evolution (LTE), a user equipment is scheduled for uplink data transmissions by transmitting a scheduling request to a wireless communication network node and receiving a scheduling grant in response to the scheduling request.

As long as, the user equipment (UE) has not received the scheduling grant, the UE needs to retransmit a scheduling request after SR-Prohibit status timer expiry, and to repeat retransmissions until a scheduling grant is received or until the UE has performed a maximum number of scheduling request retransmissions permitted.

When UE has performed a maximum number of scheduling request retransmissions permitted, it is considered by the UE that uplink synchronization is lost and thus, the UE needs to initiate random access procedure.

SUMMARY

Accordingly, there is a need for methods, electronic devices and wireless communication network nodes, which mitigates or alleviates the shortcomings of the existing uplink scheduling procedure: e.g. "blind" retransmissions for the scheduling request which leads to unnecessary UE power consumption, and erroneous triggers of uplink synchronisation.

The present disclosure provides a method, performed by an electronic device, for an uplink data transmission. The electronic device is configured to communicate with a wireless communication network node. The method comprises transmitting a scheduling request for the uplink data transmission to the wireless communication network node. The method comprises receiving a signalling message from the wireless communication network node. The signalling message is indicative of a first time period during which the electronic device is not required to monitor a downlink control channel with the wireless communication network node.

It is an advantage of the present disclosure that the uplink scheduling procedure is improved in that the electronic device, by receiving a signalling message indicative of the first time period where the electronic device is not required to monitor the downlink control channel for uplink scheduling, is advantageously capable of, only when necessary: monitoring the downlink control channel and retransmitting scheduling requests. This allows the electronic device to save power.

Further, this disclosure provides a method, performed by a wireless communication network node, for adapting a scheduling of an uplink data transmission (e.g. requested by the electronic device). The wireless communication network node is configured to communicate with an electronic device. The method comprises receiving a scheduling request for an uplink data transmission from the electronic device. The method comprises determining, based on a network condition, one or more radio resources available for the uplink data transmission. The method comprises determining, based on the determined one or more radio resources, a first time period indicative of a first time window where no radio resource is available for the uplink data transmission requested by the electronic device. The method comprises transmitting a signalling message to the electronic device, wherein the signalling message is indicative of the first time period.

It is an advantage of the present disclosure that the uplink scheduling procedure is improved in that the wireless communication network node, by transmitting a signalling message indicative of a first time period (indicative of a first time window) where no radio resource is available for the uplink data transmission requested by the electronic device, enables an enhanced scheduling and uplink resource usage (because "blind" retransmission of scheduling requests, unnecessary triggers of random access procedures, and unnecessary retransmissions of the scheduling request are reduced). This further avoids un-necessary triggers of uplink synchronization when no radio resource is available for the uplink data transmission requested. Finally, this may lead to an enhanced used of the radio resources in a system.

The present disclosure provides an electronic device wireless configured to transmit a scheduling request for an uplink data transmission to the wireless communication network node, receive a signalling message from the wireless communication network node, wherein the signalling message is indicative of a first time period, wherein the first time period is indicative of a first time window during which the electronic device is not required to monitor a downlink control channel.

The present disclosure provides a wireless communication network node configured to receive a scheduling request for an uplink data transmission from the electronic device. The wireless communication network node is configured to determine, based on a network condition, one or more radio resources available for the uplink data transmission. The wireless communication network node is configured to determine, based on the determined one or more resources, a first time period indicative of a first time window where no radio resource is available for the uplink data transmission requested by the electronic device. The wireless communication network node is configured to transmit a signalling message to the electronic device. The signalling message is indicative of the first time period.

The disclosure provides a system comprising an electronic device configured to perform any of the methods disclosed herein and/or a wireless communication network node configured to perform any of the methods disclosed herein.

The present disclosure provides a computer readable storage medium storing one or more programs, the one or more programs comprising instructions, which when executed by an electronic device cause the electronic device to perform any of the methods disclosed herein.

The present disclosure provides a computer readable storage medium storing one or more programs, the one or more programs comprising instructions, which when executed by a wireless communication network node cause the wireless communication network node to perform any of the methods disclosed herein.

The computer programs, the electronic devices, the systems provide advantages corresponding to the advantages already described in relation to the methods performed by the electronic device.

The computer programs, the wireless communication network nodes, the systems provide advantages corresponding to the advantages already described in relation to the methods by the wireless communication network node.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1A:
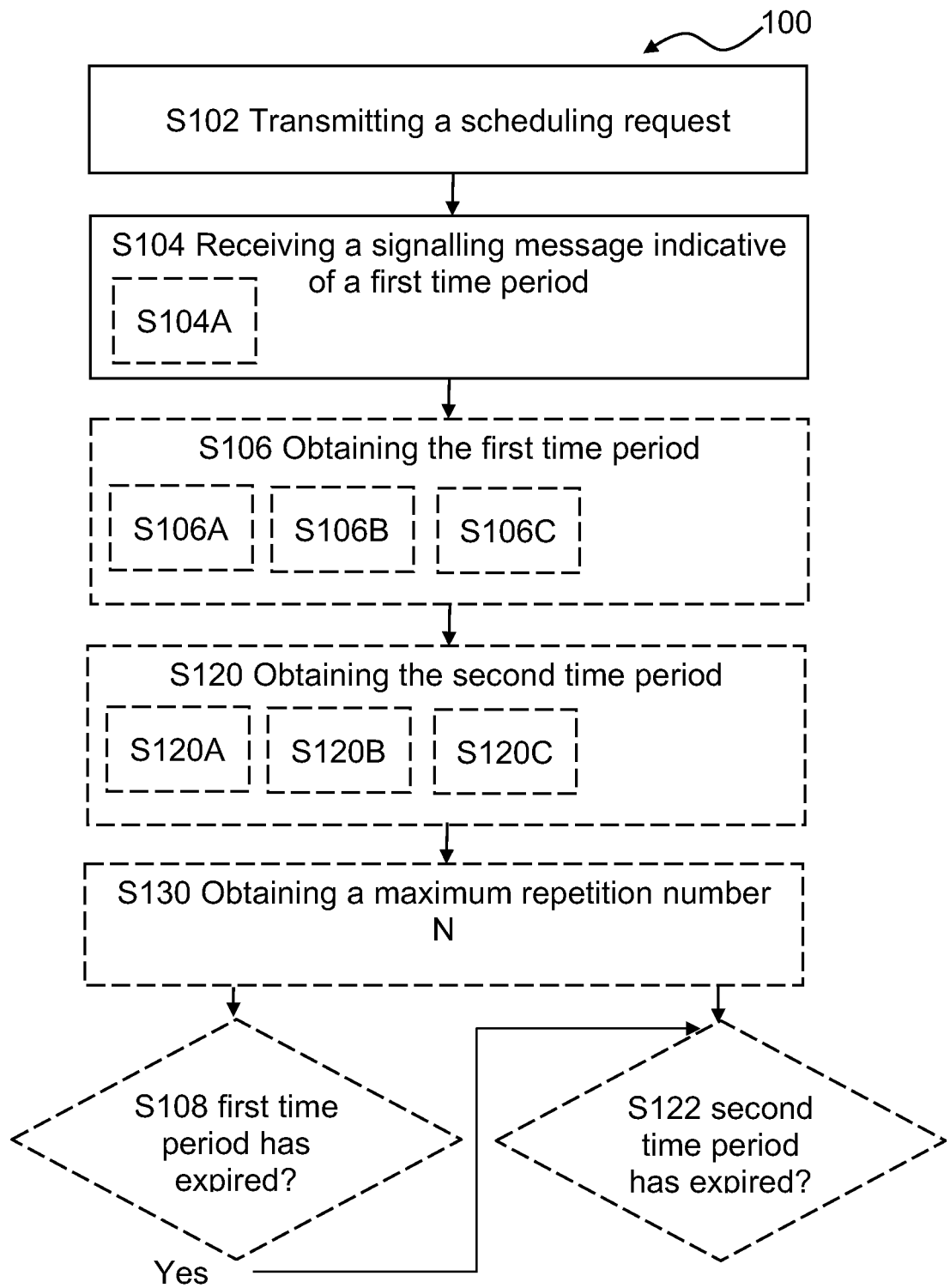
FIGS. 1A-1C are flow diagrams illustrating exemplary methods performed by an exemplary electronic device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which are essential to the understanding of the invention, while other details have been left out. Throughout, the same reference numerals are used for identical or corresponding parts.

In an exemplary 3GPP wireless communication network, (e.g. LTE, and/or new radio (NR)), an electronic device (e.g. a user equipment) may request an uplink data transmission by transmitting a scheduling request to the wireless communication network node. Upon reception of the scheduling request, the wireless communication network node may then allocate resources for the electronic device to perform the uplink data transmission and may transmit a scheduling grant when the resources are allocated. Upon receipt of the scheduling grant, the electronic device in this example transmits the uplink data according to the scheduling grant.

In an example where the wireless communication network node does not have any resources available for the electronic device to transmit, or where for any other reason the wireless communication network node does not revert (e.g. acknowledge) with any information regarding scheduling request, the electronic device is required to retransmit a scheduling request after SR-Prohibit status timer (where SR denotes scheduling request), until the electronic device receives a scheduling grant or until the electronic device has performed retransmissions of the scheduling request up to a specified maximum called max SR times. If the electronic device has retransmitted the scheduling request a number of times equal to max SR times regarding the same uplink data transmission, the electronic device considers having lost uplink synchronization with the wireless communication network node, and thus the electronic device initiates a random access procedure with the wireless communication network node. The initiation of random access procedure may be seen in this example as unnecessary and the retransmissions of the scheduling may be seen as "blind" retransmission because the electronic device does not receive any information from the wireless communication network node regarding the lack of feedback in response to the scheduling request. In this exemplary situation, the electronic device consumes unnecessarily power (e.g. battery power), because the electronic device repeatedly monitors the downlink channel for receiving a potential scheduling grant and retransmits a scheduling request until receipt of a scheduling grant.

The present disclosure provides methods, electronic devices and wireless communication network nodes which aim, inter alia, at mitigating or alleviating the shortcomings of the existing uplink scheduling procedure: e.g. "blind" retransmissions for the scheduling request, and erroneous triggers of uplink synchronisation, which unnecessarily consume power at the electronic device.

Figure 1B:
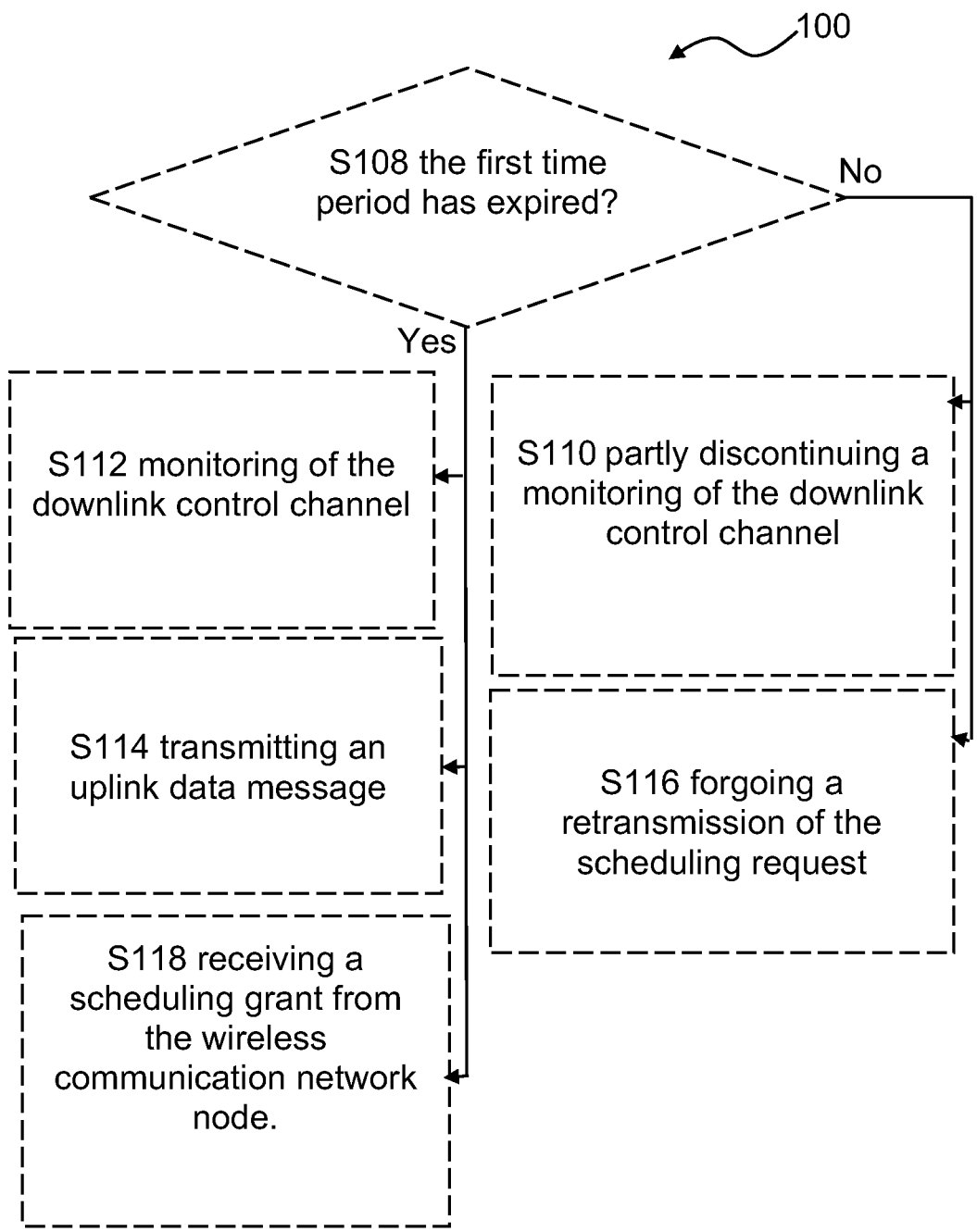
Figure 1C:
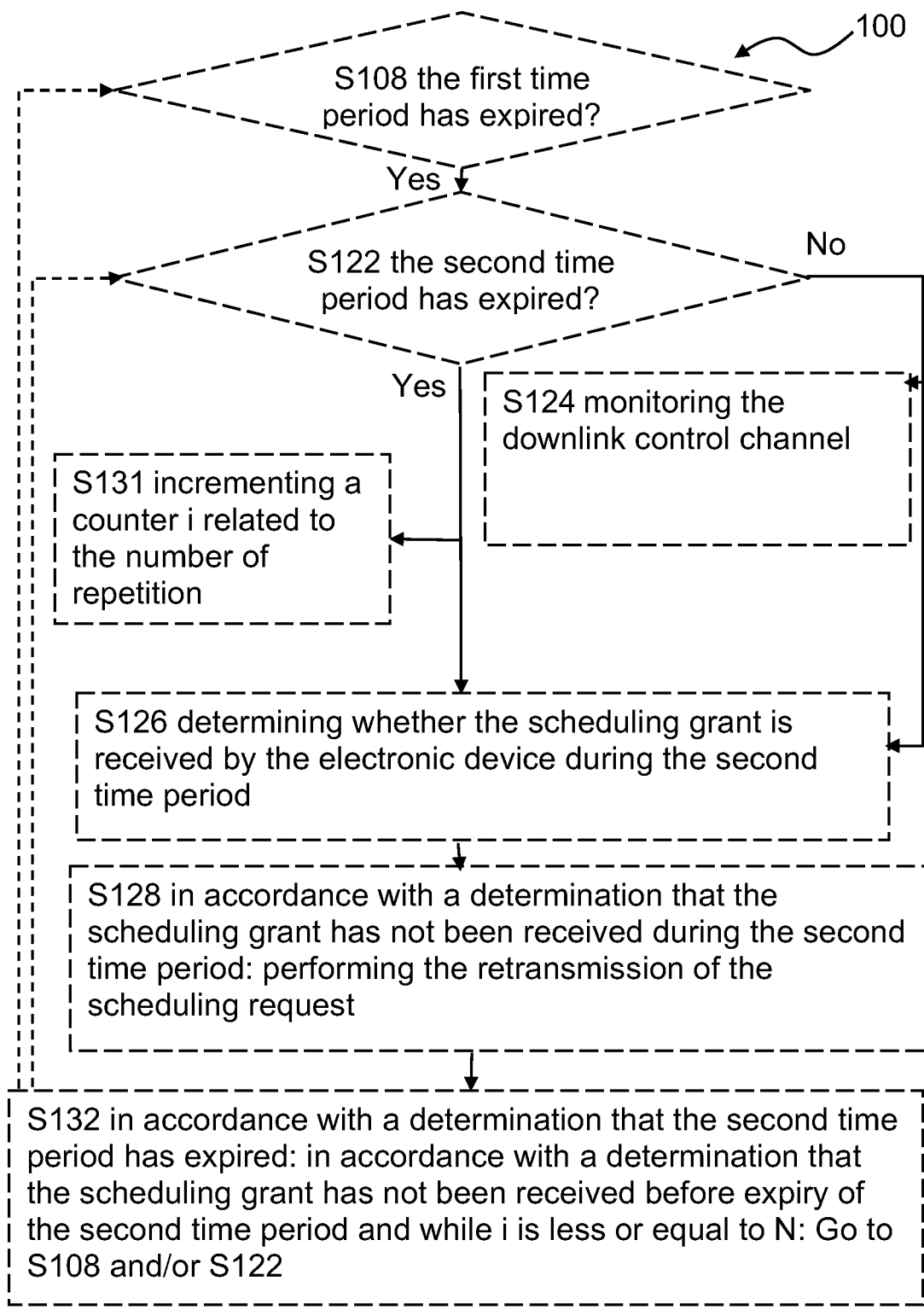

FIGS. 1A-1C show flow diagrams illustrating exemplary methods 100 performed by an exemplary electronic device according to this disclosure. The present disclosure provides a method 100, performed by an electronic device, for an uplink data transmission, e.g. for an uplink communication. The electronic device (such as electronic device 300 of FIG. 3) is configured to communicate with a wireless communication network node.

An uplink data transmission refers for example to a transmission of user data from the electronic device to the wireless communication network node (e.g. in a user plane).

The electronic device may comprise a user equipment, a mobile station, and/or, a portable electronic device, and/or a user terminal. The electronic device may refer to a computing device configured to communicate with a wireless communication network node via a wireless communication network. For example, the wireless communication network comprises a cellular communication network (e.g. a 3GPP communication network, e.g. LTE, and/or new radio (NR)), and/or a short-range communication network, and/or a wireless local area network.

The method 100 comprises transmitting S102 a scheduling request for the uplink data transmission to the wireless communication network node (e.g. in an uplink control channel, e.g. a physical uplink control channel). A scheduling request is a request to obtain one or more radio resources allocated to the electronic device for uplink data transmission to the wireless communication network. The scheduling request may be indicative of the amount of data to be transmitted and the class of service required. The scheduling request disclosed herein may comprise a scheduling request indicator (SRI).

The method 100 comprises receiving S104 a signalling message from the wireless communication network node. The signalling message is indicative of a first time period during which the electronic device is not required to monitor a downlink control channel with the wireless communication network node.

It may be appreciated that the present disclosure allows to improve the uplink scheduling procedure, by informing the electronic device via the signalling message that monitoring of a downlink control channel is not required during a first period. Thus, the present disclosure may advantageously lead to power saving at the electronic device because the electronic device is thereby informed that monitoring of the downlink control channel is not required for the first time period.

Stated differently, it may be seen that the present disclosure enables, inter alia, to acknowledge a scheduling request using the signaling message without directly scheduling an uplink data transmission, allowing the electronic device to e.g. enter a power saving mode for a first time period until being scheduled for uplink data transmission. This is particularly advantageous over solutions where the electronic device is required to retransmit a scheduling request even when the wireless communication network has received the scheduling request and cannot schedule the uplink data transmission of the electronic device in the upcoming transmission time interval (TTI).

A signalling message comprises for example a message from the wireless communication network node that carries signalling information and/or control information to the electronic device, such as a message from the wireless communication network node that carries downlink signalling information and/or downlink control information to the electronic device. It is envisaged that the signalling message belongs to e.g. a control plane. In the present disclosure, the signalling message comprises for example a message in the control plane transmitted by the wireless communication device to the electronic device in response to the scheduling request.

In one or more exemplary methods and electronic devices, the signalling message is in itself indicative of the first time period, e.g. without having a specific field included in the signalling message, and upon receipt of the signalling message, the electronic device is configured to act according to the present disclosure.

A first time period may be indicative of a first time window that has been assessed by the wireless communication device as a time window during which the electronic device is not required to monitor a downlink control channel (e.g. to monitor for uplink scheduling, e.g. for a scheduling grant) with the wireless communication network node, e.g. due to the lack of immediate radio resources available for the uplink data transmission. In other words, the first time period for example indicates a time window where no scheduling grant is expected. The downlink control channel comprises for example a physical downlink control channel. For example, the first time period may comprise a time period during which the electronic device is configured to enter a power saving mode.

In one or more exemplary methods, the signalling message is indicative of a receipt of the scheduling request at the wireless communication network node. For example, the signalling message indicates that the scheduling request has been successfully received at the wireless communication network node and that no radio resources are available for the uplink data transmission (within the next K TTIs, wherein K is in the range of 5 to 100, e.g. 5 to 50, or e.g. 10 to 100). In one or more exemplary methods, K may be determined by the wireless communication network node based on e.g. the SRI. For example, the signalling message is for example indicative of a receipt of the scheduling request at the wireless communication network node and of no immediate scheduling of the requested uplink data transmission by the wireless communication network node.

The method 100 may comprise obtaining S106 the first time period according to the received signalling message. In other words, obtaining S106 the first time period according to the received signalling message comprises for example obtaining S106 the first time period using the received signalling message. In one or more exemplary methods and electronic devices, the signalling message is in itself indicative of the first time period, e.g. without having a specific field included in the signalling message, and upon receipt of the signalling message, the electronic device is configured to obtain the first time period, e.g. by retrieving the first time period from a memory module of the electronic device. This may advantageously lead to an improved bandwidth usage for the transmission of the signalling message, as the signalling message does not need to include further fields for indicating the first time period.

In one or more exemplary methods, obtaining S106 according to the received signalling message, the first time period comprises receiving S106A from the wireless communication network node the signalling message comprising a first time period parameter, the first time period parameter being indicative of the first time period. In other words, in one or more exemplary methods and electronic devices, the signalling message comprises a first time period parameter, the first time period parameter being indicative of the first time period. The first time period parameter may be expressed in time unit, and/or in sub-frame, and/or transmission time interval (TTI). In one or more exemplary methods, the first time period parameter may be below or equal to 50 ms. In one or more exemplary methods, the first time period parameter may be in the range of 5 ms to 50 ms. In one or more exemplary systems, TTI may be equal to 1 ms. In one or more exemplary methods where TTI is 1 ms, the first time period parameter may be in the range of 5 TTIs to 50 TTIs, e.g. 5 TTIs to 10 TTIs. It may be envisaged in one or more exemplary methods that the first time period parameter is determined inter alia based on SRI. This may advantageously enhance the uplink scheduling procedure by allowing the first time period to be adaptive to network conditions at the wireless communication network node.

In one or more exemplary methods, obtaining S106, according to the received signalling message, the first time period comprises receiving S106B from the wireless communication network node the signalling message comprising a first indicator for indicating to the electronic device to retrieve the first time period, and retrieving the first time period. In other words, in one or more exemplary methods and electronic devices, the signalling message comprises a first indicator for indicating to the electronic device to retrieve the first time period. The first indicator is for example an identifier that enables the electronic device to retrieve a first time period, and/or a first time period parameter from a memory module of the electronic device configured to store the first time period or the first time period parameter. The electronic device is for example configured to obtain and store the first time period (or the first time period parameter) during a configuration procedure (e.g. network configuration procedure, e.g. a radio resource control (RRC) connection procedure). Optionally, the electronic device is for example configured to store the first time period as system information in the memory module. This may advantageously enhance the uplink scheduling procedure by allowing the first time period to be adaptive to network conditions at the wireless communication network node and to be communicated using a first indicator that may point to the appropriate first time period to be used. Further, this may improve bandwidth usage for the transmission of the signalling message.

The method may comprise determining S108 whether the first time period has expired. Stated differently, determining S108 whether the first time period has expired comprises determining whether expiry of the first time period is reached (e.g. whether the first time period expires).

In one or more exemplary methods, the method 100 comprises: in accordance with a determination that the first time period has not expired, at least partly stopping S110 a monitoring of the downlink control channel. For example, the method 100 comprises: in accordance with a determination that the first time period has not expired, at least partly stopping S110 a monitoring of the downlink control channel, e.g. a monitoring for the requested uplink scheduling (e.g. monitoring for a scheduling grant in response to the scheduling request). In other words, the method comprises for example at least partly stopping until the expiry of the first time period. In one or more exemplary methods, at least partly stopping S110 a monitoring of the downlink control channel comprises stopping a monitoring of the downlink control channel. This improves the uplink scheduling procedure, by at least partly stopping monitoring of a downlink control channel which may lead to power saving at the electronic device.

In one or more exemplary methods, the method 100 comprises in accordance with a determination that the first time period has expired, monitoring S112 the downlink control channel (e.g. monitoring for the requested uplink scheduling). For example, monitoring S112 the downlink control channel comprises resuming the monitoring of the downlink control channel. Monitoring the downlink control channel is for example advantageously performed to obtain the resource allocation information (e.g. frequency allocation and/or time allocation) and/or the modulation and coding scheme (MCS) information to be used for the uplink data transmission.

In one or more exemplary methods, the method 100 comprises: in accordance with a determination that the first time period has expired, transmitting S114 an uplink data message to the wireless communication network node. Transmitting S114 an uplink data message to the wireless communication network node is for example performed using an uplink shared channel (e.g. a physical uplink shared channel) in accordance with the MCS information obtained for the uplink data transmission. Transmitting S114 an uplink data message to the wireless communication network node is for example performed according to the signalling message, when the signalling message acts as a scheduling grant carrying information regarding resource allocation. This way, the electronic device is required to monitor the downlink channel one time to obtain the resource allocation information, which may be advantageous in terms of bandwidth usage, power consumption, and resource allocation.

In one or more exemplary methods, the method 100 comprises: in accordance with the determination that the first time period has not expired, forgoing S116 a retransmission of the scheduling request to the wireless communication network node in response to receiving the signalling message. For example, before the first time period expires, the electronic device is not required to perform any retransmission of the scheduling request. This allows avoiding un-necessary scheduling request retransmissions by the electronic device when no radio resources are found available at a wireless communication network node in proximate TTIs.

In one or more exemplary methods, the method 100 comprises: in accordance with the determination that the first time period has expired, receiving S118 a scheduling grant from the wireless communication network node. The scheduling grant is for example indicative of one or more allocated radio resources for the uplink data transmission. Receiving S118 may be for example performed prior to transmitting the uplink data message to the wireless communication network node.

In one or more exemplary methods, receiving S104 the signalling message from the wireless communication network node comprises receiving S104A a scheduling grant from the wireless communication network node, the scheduling grant being indicative of the first time period. In one or more exemplary methods, the scheduling grant comprises a first indicator for informing the electronic device to retrieve the first time period and/or a first time period parameter indicative of the first time period. The one or more exemplary methods where the signalling message comprises a scheduling grant are considered advantageous in that the electronic device is required to monitor the downlink channel one time to obtain the resource allocation information and indication of the first time period. In other words, the one or more exemplary methods where the signalling message comprises a scheduling grant are considered advantageous in that the electronic device is allowed to transmit the uplink data message upon expiry of the first time period. This may be particularly advantageous when the radio resources are not available in proximate TTIs due to network conditions.

In one or more exemplary methods, transmitting S114 an uplink data message to the wireless communication network node is performed according to the received scheduling grant. In one or more exemplary methods, transmitting S114 an uplink data message to the wireless communication network node is performed according to the scheduling grant received as a signalling message, i.e. a scheduling grant indicative of the first time period. In one or more exemplary methods, transmitting S114 an uplink data message to the wireless communication network node is performed according to the scheduling grant received on or after expiry of the first time period.

In one or more exemplary methods, the signalling message is indicative of a second time period after which the electronic device is permitted to retransmit the scheduling request. The second time period refers for example to a time period after which (e.g. upon expiry) the electronic device is permitted (e.g. required, enabled) to retransmit the scheduling request. The second time period comprises for example a time period where resource allocation information is expected to be received at the electronic device. In other words, at expiry of the second time period, no scheduling grant is to be expected from the wireless communication network node. Retransmitting the scheduling request comprises for example transmitting a new scheduling request for the uplink data transmission. In one or more exemplary methods, the method comprises: forgoing retransmission of the scheduling request in accordance with a determination that the second time period has not expired. In other words, the scheduling request may not be retransmitted during the second time period.

In one or more exemplary methods and electronic devices, the method comprises: starting the second time period upon or after expiry of the first time period. It may be envisaged that the second time period is shorter than the first time period in one or more exemplary methods and electronic devices where the second time period is started upon or after expiry of the first time period.

In one or more exemplary methods and electronic devices, the method comprises: starting the second time period upon receipt of the signalling message. It may be envisaged that the second time period includes the first time period and is thereby longer than the first time period in one or more exemplary methods and electronic devices where the second time period is started upon receipt of the signalling message.

In one or more exemplary methods, the method comprises: obtaining S120, according to the received signalling message, a second time period after which the electronic device is permitted to retransmit the scheduling request. For example, when no scheduling grant has been received at the electronic device for the scheduling request upon expiry of the second time period, the electronic device is permitted (e.g. required, enabled) to retransmit the scheduling request. This advantageously avoid to unnecessarily retransmit the scheduling request before any radio resource can possibly be allocated according to the wireless communication network node.

In one or more exemplary methods, the method 100 comprises determining S122 whether the second time period has expired. In one or more exemplary methods and electronic device, determining S122 whether the second time period has expired is performed after determining S108 whether the first time period has expired. In one or more exemplary methods and electronic device, determining S122 whether the second time period has expired comprises in accordance with a determination that the first time period has expired, determining whether the second time period has expired.

Stated differently, determining S122 whether the second time period has expired comprises determining whether expiry of the second time period is reached.

In one or more exemplary methods, the method 100 comprises: in accordance with a determination that the second time period has not expired, monitoring S124 the downlink control channel. For example, during the second time period, the electronic device monitors the downlink control channel for e.g. a possible scheduling grant.

In one or more exemplary methods, the method 100 comprises: in accordance with a determination that the first time period has expired, in accordance with a determination that the second time period has not expired, monitoring the downlink control channel.

In one or more exemplary methods, the method 100 comprises determining S126 whether the scheduling grant is received by the electronic device during the second time period (e.g. before or up to the expiry of the second time period). In other words, the method 100 comprises in accordance with a determination that the second time period has not expired, determining whether the scheduling grant is received by the electronic device. The wireless communication network node is configured to indicate one or more radio resources allocated in a scheduling grant so as to enable the electronic device to transmit the uplink data accordingly.

In one or more exemplary methods, the method 100 comprises: in accordance with a determination that the second time period has expired and in accordance with a determination that the scheduling grant has not been received during the second time period (before expiry of the second time period), performing S128 the retransmission of the scheduling request to the wireless communication network node. Performing S128 the retransmission of the scheduling request to the wireless communication network node comprises for example transmitting a new scheduling request for the uplink data transmission.

In one or more exemplary methods, the method 100 comprises obtaining S130, according to the signalling message, a maximum repetition number N for the first time period (e.g. for repeating S108) and/or the second time period (e.g. for repeating S122). The maximum repetition number N refers for example to a maximum number of times that the determining operation S108 and/or the determining operation S122 is repeated. N may be expressed in integers, and may range from 1 to 50, such as from 1 to 20, such as from 1 to 10. It may be envisaged that N depends of the first time period parameter. For example, a longer (e.g. of 10 ms or more) first time period parameter may be coupled with a smaller N (e.g. less or equal to 10) while a shorter (e.g. less than 10 ms) first time period parameter may be coupled with a larger N (e.g. larger than 10). In one or more exemplary methods, the method 100 comprises incrementing S131 a counter i related to the number of repetitions of the first time period and/or the second time period (e.g. repetitions of the determining operation S108 and/or S122). In one or more exemplary methods, incrementing S131 a counter i comprises incrementing the counter i, e.g. by 1, for each repetition the determining operation S108. In one or more exemplary methods, incrementing S131 a counter i comprises incrementing the counter i, e.g. by 1, for each repetition the determining operation S122. In one or more exemplary methods, incrementing S131 a counter i comprises incrementing the counter i, e.g. by 1, for each repetition the determining operation S108 followed by followed by performing the determining operation S122.

In one or more exemplary methods, the method 100 comprises in accordance with a determination that the second time period has expired, in accordance with a determination that the scheduling grant has not been received before expiry the second time period and while the maximum repetition number N is not reached (e.g. while I is less or equal to N) determining S132 whether the first time period and/or the second time period have expired. For example, determining S132 whether the first time period and/or the second time period have expired comprises determining whether the first time period has expired ((i.e. proceeding to S108)). For example, determining S132 whether the first time period and/or the second time period have expired comprises determining whether the second time period has expired (i.e. proceeding to S122). For example, determining S132 whether the first time period and/or the second time period have expired comprises determining whether the first time period and the second time period have expired (i.e. proceeding to S108 followed by S122).

In one or more exemplary methods, in accordance with a determination that the second time period has expired, in accordance with a determination that the scheduling grant has not been received before expiry the second time period and while the maximum repetition number N is not reached (e.g. while i is less or equal to N) determining S132 whether the first time period and/or the second time period have expired comprises determining S108 whether the first time period has expired, performing operation S131, performing any one or more of operations: S112, S114, S118 in accordance with a determination that the first time period has expired, and performing any one or more of operations: S110, S116 in accordance with a determination that the first time period has not expired.

In one or more exemplary methods, in accordance with a determination that the second time period has expired, in accordance with a determination that the scheduling grant has not been received before expiry the second time period and while the maximum repetition number N is not reached (e.g. while I is less or equal to N) determining S132 whether the first time period and/or the second time period have expired comprises determining S122 whether the second time period has expired, performing operation S131, performing any one or more of operations: S128, S132 in accordance with a determination that the second time period has expired, or performing any one or more of operations: S124, S126 in accordance with a determination that the second time period has not expired.

In one or more exemplary methods, the method 100 comprises in accordance with a determination that the second time period has expired, in accordance with a determination that the scheduling grant has been received before expiry the second time period: transmitting an uplink data message to the wireless communication network node.

In one or more exemplary methods, obtaining, according to the received signalling message, the first time period S106 and/or the second time period S120 comprises receiving from the wireless communication network node the signalling message comprising a first time period parameter S106A and/or a second time period parameter S120A, the first time period parameter being indicative of the first time period, and the second time period parameter being indicative of the second time period. This may advantageously enhance the uplink scheduling procedure by allowing the first time period and/or the second time period to be adaptive to network conditions at the wireless communication network node.

The second time period parameter may be expressed in time unit, and/or in sub-frame, and/or transmission time interval (TTI). In one or more exemplary methods, the second time period parameter may be below or equal to 50 ms. In one or more exemplary methods, the second time period parameter may be in the range of 5 ms to 50 ms. In one or more exemplary systems, TTI may be equal to 1 ms. In one or more exemplary methods where TTI is 1 ms, the second time period parameter may be in the range of 5 TTIs to 10 TTIs.

In one or more exemplary methods, the first time period is characterized by a first time period parameter which is an absolute first timer value. In one or more exemplary methods, the second time period is characterized by a second time period parameter which is an absolute second timer value.

In one or more exemplary methods, obtaining, according to the received signalling message, the first time period S106 and/or the second time S120 period comprises receiving from the wireless communication network node the signalling message comprising a first indicator S106B and/or a second indicator S120B for indicating to the electronic device to retrieve the first time period and/or the second time period respectively, and retrieving the first time period S106C and/or the second time period S120C respectively. Retrieving the first time period S106C and/or the second time period S120C comprises for example retrieving the first time period and/or the second time period from a memory module of the electronic device configured to store the first time period obtained during a configuration procedure (e.g. network configuration procedure. In one or more exemplary methods, the scheduling grant comprises a first indicator for informing the electronic device to retrieve the first time period and/or a first time period parameter indicative of the first time period. In one or more exemplary methods, the scheduling grant comprises a second indicator for informing the electronic device to retrieve the second time period and/or a second time period parameter indicative of the second time period. This may advantageously enhance the uplink scheduling procedure by allowing the first time period and/or second time period to be adaptive to network conditions at the wireless communication network node and to be communicated using a first indicator and/or a second indicator that may point to the appropriate first time period and/or the second time period to be used. Further, this may improve bandwidth usage for the transmission of the signalling message.

In one or more exemplary methods, the first time period is characterized by a first time indicator identifying a default first timer value in a set of timer values. In one or more exemplary methods, the second time period is characterized by a second time indicator identifying a default second timer value in a set of timer values. For example, a default timer value is provided without explicit signalling during the uplink scheduling procedure.

In one or more exemplary methods, the signalling message comprises one or more indicators indicative of a selection of one or more default timer values in a set of timer values.

Figure 2:
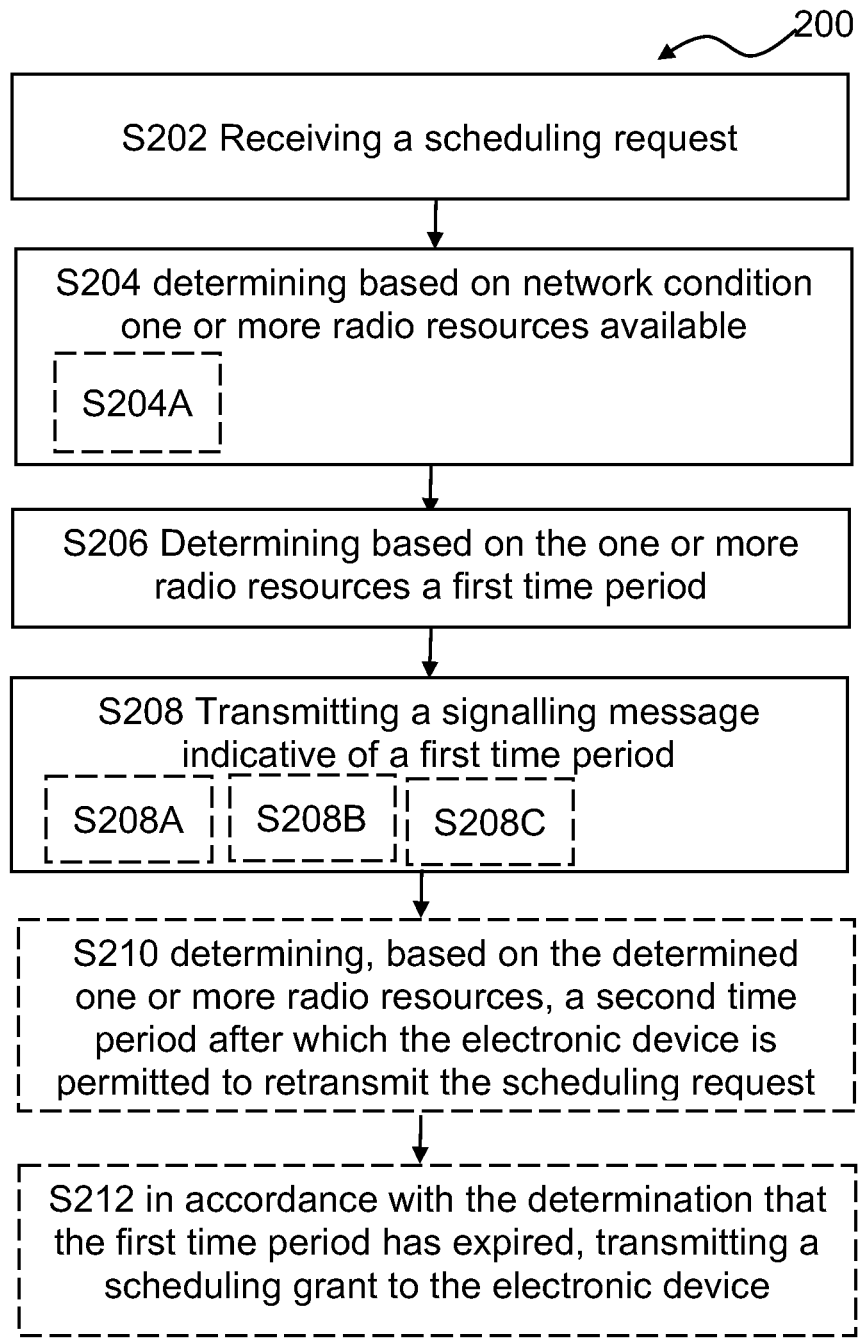
FIG. 2 is a flow diagram illustrating exemplary methods performed by an exemplary wireless communication network node according to this disclosure.

FIG. 2 shows a flow diagram illustrating an exemplary method 200, performed by an exemplary wireless communication network node according to the present disclosure.

The method 200 is performed by a wireless communication network node. The wireless communication network node is configured to communicate with an electronic device, such as an electronic device disclosed herein. The method 200 is carried out for scheduling an uplink data transmission of an electronic device configured to communicate with the wireless communication network node, e.g. for adapting a scheduling of an uplink data transmission requested by the electronic device.

The wireless communication network node refers for example to a computing network element, such as a network element configured to manage radio resource allocation. For example, the wireless communication network node comprises a base station, and/or a base transceiver station, and/or a node B, and/or an evolved Node B (eNB).

The method 200 comprises receiving S202 a scheduling request for an uplink data transmission from the electronic device. For example, the wireless communication network node receives S202 from the electronic device a scheduling request for an uplink data transmission to be carried out by the electronic device.

The method 200 comprises determining S204, based on a network condition, one or more radio resources available for the uplink data transmission. A network condition refers for example to radio access network condition, such as condition in terms of radio resource controlled by the wireless network node, such as radio resource available for allocation by the wireless network node. A network condition may comprise a network load (e.g. available radio resources, e.g. available physical resource blocks) for one or more cells controlled by the wireless communication network node.

The method 200 comprises determining S206, based on the determined one or more radio resources, a first time period indicative of a first time window where no radio resource is available for the uplink data transmission requested by the electronic device.

The method 200 comprises transmitting S208 a signalling message to the electronic device, wherein the signalling message is indicative of the first time period.

It is an advantage of the present disclosure to provide a method performed by the wireless communication network node which allows the electronic device to at least partly stop the monitoring of the downlink control channel for scheduling of the uplink data transmission requested. The disclosed method avoids receiving possible retransmissions of the scheduling request from the electronic device, unnecessarily (e.g. when the wireless communication network cannot schedule the uplink data transmission of the electronic device in the upcoming transmission time interval and the electronic device is not informed accordingly).

In one or more exemplary methods, the signalling message is indicative of a receipt of the scheduling request at the wireless communication network node.

In one or more exemplary methods, the scheduling request comprises an identifier of a class of quality of service for the uplink data transmission. In one or more exemplary methods, determining S204, based on the network condition, the one or more radio resources available for the uplink data transmission comprises determining S204A, based on the network condition and on the identifier, the one or more radio resources available for the uplink data transmission. The identifier of the class of quality of service (QoS) may be indicative of a class of quality of service: enhanced mobile broadband (eMBB), massive Machine Type Communication (mMTC), ultra-reliable and low latency communication (URLLC). The identifier of the class of quality of service comprises for example a QoS class identifier, such as defined in 3GPP systems. The identifier of the class of quality of service may be configured to specify one or more of: a packet prioritization, a delay budget, and a packet error rate performance.

In one or more exemplary methods, transmitting S208 the signalling message to the electronic device comprises transmitting S208A to the electronic device the signalling message comprising a first time period parameter indicative of the first time period.

In one or more exemplary methods, transmitting S208 the signalling message to the electronic device comprises transmitting S208B to the electronic device the signalling message comprising a first indicator for informing the electronic device to retrieve the first time period.

In one or more exemplary methods, the method 200 comprises determining S210, based on the determined one or more radio resources, a second time period after which the electronic device is permitted to retransmit the scheduling request.

In one or more exemplary methods, the signalling message comprises a second indicator for informing the electronic device to retrieve the second time period and/or a second time period parameter indicative of the second time period.

In one or more exemplary methods, transmitting S208 the signalling message to the electronic device comprises transmitting S208C a scheduling grant to the electronic device, the scheduling grant being indicative of the first time period. In other words, in one or more exemplary methods, the signalling message comprises a scheduling grant indicative of the first time period. In one or more exemplary methods, the scheduling grant comprises an indicator for informing the electronic device to retrieve the first time period. In one or more exemplary methods, the scheduling grant comprises a first time period parameter indicative of the first time period. In one or more exemplary methods, the scheduling grant may be indicative of the second time period. In one or more exemplary methods, the scheduling grant comprises a second indicator for informing the electronic device to retrieve the second time period. In one or more exemplary methods, the scheduling grant comprises a second time period parameter indicative of the second time period.

In one or more exemplary methods, the method 200 comprises: in accordance with the determination that the first time period has expired, transmitting S212 a scheduling grant to the electronic device. The scheduling grant is indicative of one or more allocated resources for the uplink data transmission. In one or more exemplary methods, the method 200 comprises determining whether the first time period has expired.

Figure 3:
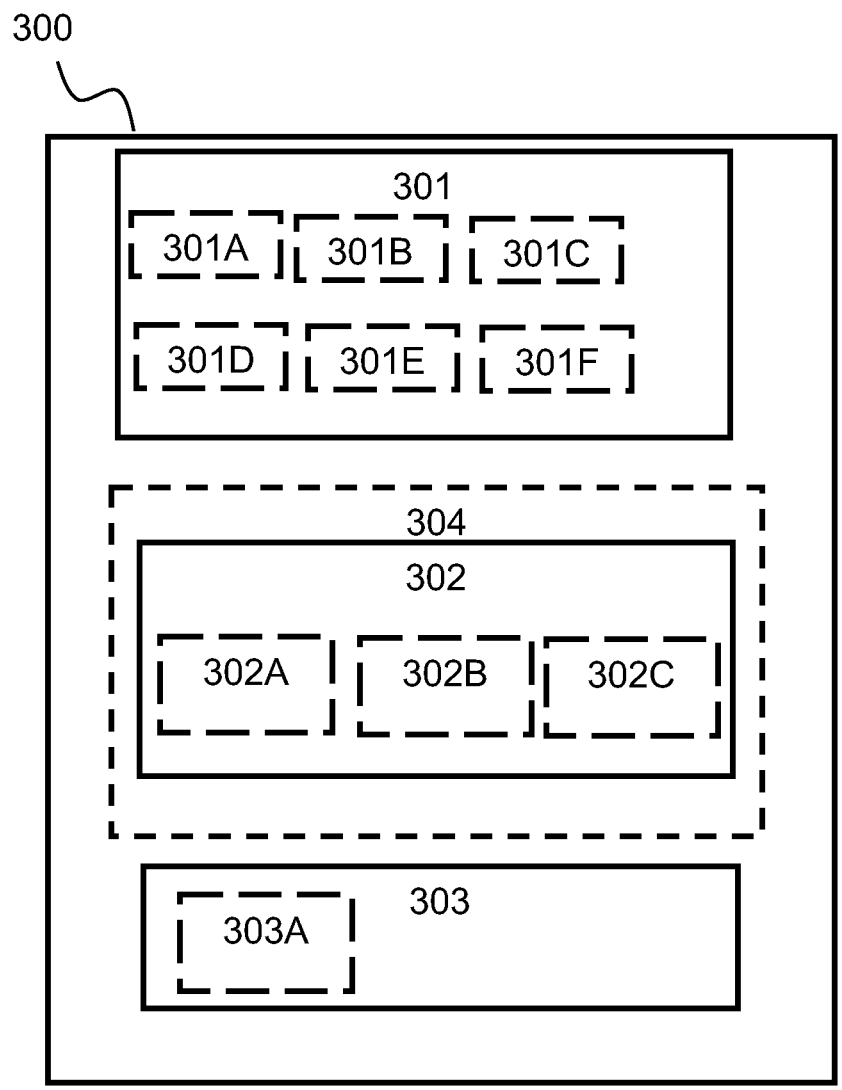
FIG. 3 is a block diagram schematically illustrating an exemplary electronic device according to this disclosure.

FIG. 3 shows a block diagram of an exemplary electronic device 300 according to the disclosure.

The electronic device 300 is configured to transmit a scheduling request for an uplink data transmission to the wireless communication network node, to receive a signalling message from the wireless communication network node, wherein the signalling message is indicative of a first time period, wherein the first time period is indicative of a first time window during which the electronic device is not required to monitor a downlink control channel, e.g. for uplink scheduling.

In one or more electronic devices, the electronic device 300 comprise a memory module 301, a processor module 302 coupled to the memory module 301, and an interface module 303 coupled to the processor module 302.

The interface module 303 is configured for wireless communication with a wireless communication network node. The interface module 303 comprises for example a wireless interface module 303A configured for cellular communication. The interface module 303 is configured to transmit a scheduling request for an uplink data transmission to the wireless communication network node.

The interface module 303 is configured to receive a signalling message from the radio network node (such as via the wireless interface module 303A). The signalling message is optionally indicative of a receipt of the scheduling request at the wireless communication network node. The signalling message is indicative of a first time period. The first time period is indicative of a first time window during which the electronic device is not required to monitor a downlink control channel.

The processor module 302 is optionally configured to obtain, the first time period according to the received signalling message (e.g. via an obtainer module 302A of the processor module 302).

The processor module 302 is optionally configured to determine whether the first time period has expired (e.g. via a determiner module 302B of the processor module 302)

The processor module 302 is optionally configured to, in accordance with a determination that the first time period has not expired, at least partly stop a monitoring of a downlink control channel (e.g. via a monitoring module 302C).

The processor module 302 is optionally configured to perform any of the operations disclosed in FIGS. 1A-1C. The operations of the electronic device 300 may be embodied in the form of executable logic routines (e.g., lines of code, software programs, etc.) that are stored on a non-transitory computer readable medium (e.g., the memory module 301) and are executed by a control module 304 (using the processor module 302)

Furthermore, the operations of the electronic device 300 may be considered a method that the corresponding device is configured to carry out. Also, while the described functions and operations may be implemented in software, such functionality may as well be carried out via dedicated hardware or firmware, or some combination of hardware, firmware and/or software.

The memory module 301 may be one or more of a buffer, a flash memory, a hard drive, a removable media, a volatile memory, a non-volatile memory, a random access memory (RAM), or other suitable device. In a typical arrangement, the memory module 301 may include a non-volatile memory for long term data storage and a volatile memory that functions as system memory for the processor module 302. The memory module 301 may exchange data with the processor module 302 over a data bus. Accompanying control lines and an address bus between the memory module 301 and the processor module 302 also may be present (not shown in FIG. 3). The memory module 301 is considered a non-transitory computer readable medium.

The memory module 301 may be configured to store or have stored thereon the first time period 301A or the first time period parameter 301B. The first time period 301A or the first time period parameter 301B are for example indexed by a first indicator 301C, such as in a look-up table. The lookup table may comprise a set of timer values, such as a set of default timer values to be used for time periods and/or time period parameters according to this disclosure.

The memory module 301 may be configured to store or have stored thereon the second time period 301D or the second time period parameter 301E. The second time period 301D or the second time period parameter 301E are for example indexed by a second indicator 301F, such as in a look-up table.

Figure 4:
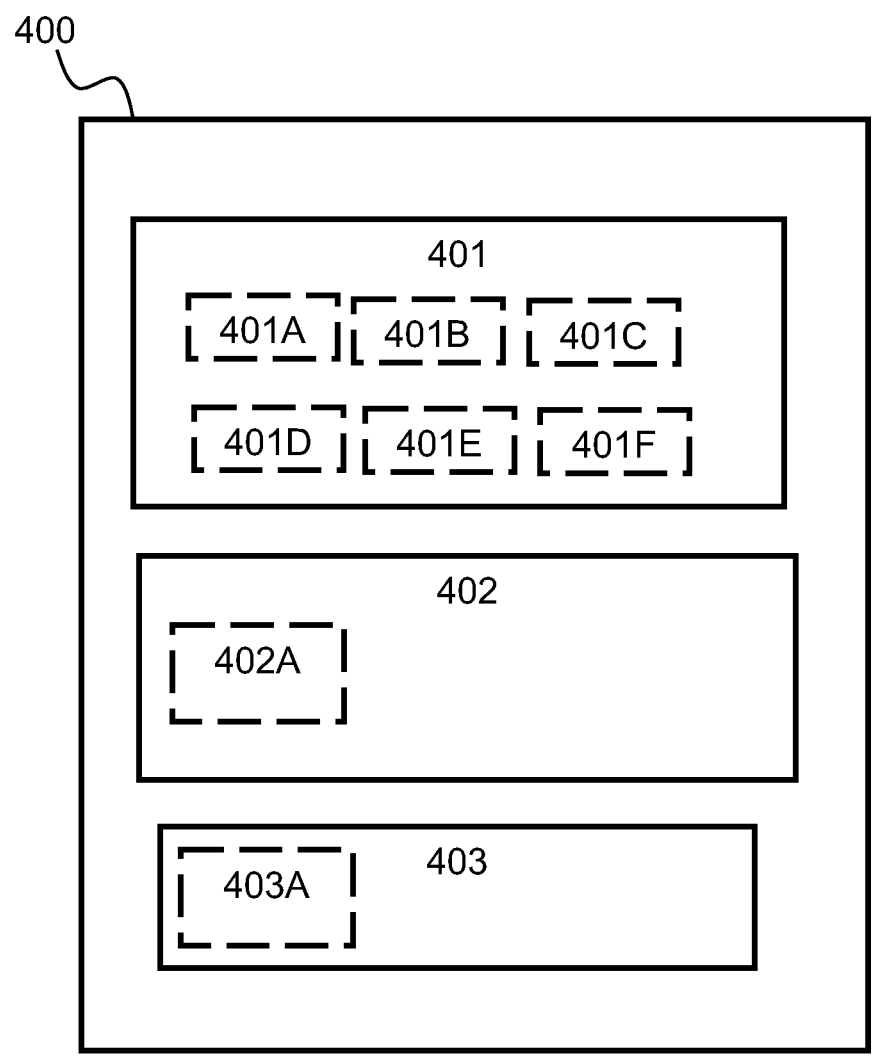
FIG. 4 is a block diagram schematically illustrating an exemplary wireless communication network node according to this disclosure, FIG. 5 schematically illustrates an exemplary system according to this disclosure.

FIG. 4 shows a block diagram of an exemplary wireless communication network node 400 according to the disclosure. A wireless communication network node 400 may comprise a base station, and/or node B, and/or evolved node B (eNB), a radio network controller (RNC), or any other apparatus capable of controlling radio communication and managing radio resources within the cell. The wireless communication network node 400 may provide radio coverage to a cell control radio resource allocation, perform data and control signaling, etc. The wireless communication network node 400 may be seen as one communication point of the network. The cell may be a macrocell, a microcell, or any other type of cell where radio coverage is present. Further, the cell may be of any size or form.

The wireless communication network node may be configured to establish a connection with an electronic device disclosed herein, such as a user terminal, a user equipment, a mobile station, a computer, or any other apparatus capable of operating in a wireless communication network.

The wireless communication network node 400 is configured to receive a scheduling request for an uplink data transmission from the electronic device.

The wireless communication network node 400 is configured to determine, based on a network condition, one or more radio resources available for the uplink data transmission.

The wireless communication network node 400 is configured to determine, based on the determined one or more resources, a first time period indicative of a first time window where no radio resource is available for the uplink data transmission requested by the electronic device. The wireless communication network node 400 is configured to transmit a signalling message to the electronic device. The signalling message is indicative of the first time period.

In one or more exemplary wireless communication network nodes, the wireless communication network node 400 comprises a memory module 401, a processor module 402 coupled to the memory module 401, and an interface module 403 coupled to the processor module 402, wherein the interface module 403 is configured for wireless communication with an electronic device (not shown). Optionally, the interface module 403 comprises a wireless interface module 403A. The interface module 403 is configured to receive a scheduling request for an uplink data transmission from the electronic device (e.g. via the wireless interface module 403A).

The processor module 402 may be configured to determine, based on a network condition, one or more radio resources available for the uplink data transmission (e.g. using a determiner module 402A).

The processor module 402 may be configured to determine, based on the determined one or more resources, a first time period indicative of a first time window where no radio resource is available for the uplink data transmission requested by the electronic device (e.g. via the determiner module) 402A.

Optionally the interface module 403 is configured to transmit a signalling message to the electronic device (e.g. via the wireless interface 403A). The signalling message is indicative of the first time period.

The processor module 402 is optionally configured to perform any of the operations disclosed in FIG. 2. The operations of the wireless communication network node may be embodied in the form of executable logic routines (e.g., lines of code, software programs, etc.) that are stored on a non-transitory computer readable medium (e.g., the memory module 401) and are executed by the processor module 402.

Furthermore, the operations of the wireless communication network node 400 may be considered a method that the wireless communication network node 400 is configured to carry out. Also, while the described operations may be implemented in software, such functionality may as well be carried out via dedicated hardware or firmware, or some combination of hardware, firmware and/or software.

The memory module 401 may be one or more of a buffer, a flash memory, a hard drive, a removable media, a volatile memory, a non-volatile memory, a random access memory (RAM), or other suitable device. In an exemplary arrangement, the memory module 401 may include a non-volatile memory for long term data storage and a volatile memory that functions as system memory for the processor module 402. The memory module 301 may exchange data with the processor module 302 over a data bus. Accompanying control lines and an address bus between the memory module 401 and the processor module 402 also may be present (not shown in FIG. 4). The memory module 401 is considered a non-transitory computer readable medium.

The memory module 401 may be configured to store or have stored thereon the first time period 401A, and/or the first time period parameter 401B, and/or a first indicator 401C.

The memory module 401 may be configured to store or have stored thereon the second time period 401D, and/or the second time period parameter 401E, and/or a second indicator 401F.

Figure 5:
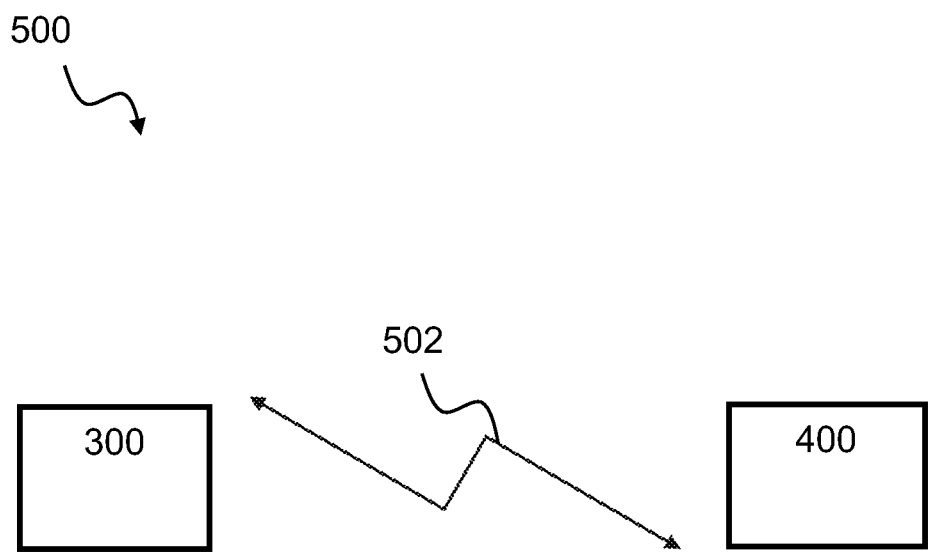

FIG. 5 shows a block diagram of an exemplary system 500 according to the disclosure. The system 500 comprises an electronic device configured to perform any of the methods disclosed herein and/or a wireless communication network node configured to perform any of the methods disclosed herein.

The system 500 may be considered as a wireless communication network or a wireless communication system, such as a radio communication network, such as the Long Term Evolution (LTE) or the LTE-Advanced (LTE-A) of the 3rd Generation Partnership Project (3GPP).

The system 500 comprises at least one wireless communication network node 400 (e.g. a base station, a base transceiver station, a Node B, or an evolved Node B), an electronic device (e.g. a user equipment, a user terminal, or a mobile station and optionally network elements that provide the connection to a core network.

With reference to FIGS. 3 and 4, the electronic device 300 and the wireless communication network node may be configured to operate in the system 500 via a wireless, radio or air interface 502. The system 500 may comprise a mobile radio network and/or broadcasting network.

The system 500 may comprise global system for mobile communications (GSM), and/or code division multiple access (CDMA) based system, and/or wideband CDMA (WCDMA) based system, and/or general packet radio service (GPRS) based system, and/or long term evolution (LTE) system, and/or a wireless local area network system, and/or WiMAX system, and/or digital video broadcasting-handheld (DVB-H) system, and/or integrated services digital broadcasting (ISDB) system, and/or high speed packet access (HSPA) system, and/or new radio (NR) system as well as advanced versions of these standards or any other appropriate standard. It will be appreciated that the electronic device 300 may be configured to communicate using more than one standard. It will be appreciated that the wireless communication network node 400 may be configured to communicate using more than one standard.

FIGS. 6A-6D are signaling diagrams 600A, 600B, 600C, 600D between an exemplary electronic device 300 and an exemplary wireless communication network node 400 according to this disclosure.

Figure 6A:
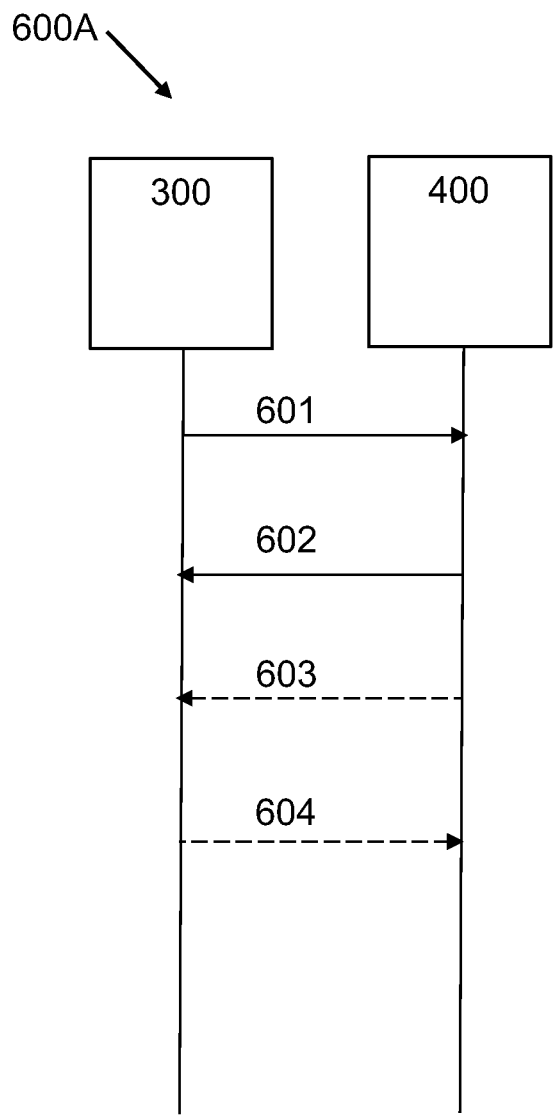
FIGS. 6A-6D are signaling diagrams between an exemplary electronic device and an exemplary wireless communication network node according to this disclosure.

Signaling diagram 600A of FIG. 6A shows that the electronic device 300 transmits to the wireless communication network 400 a scheduling request 601. Upon reception of the scheduling request, the wireless communication network node 400 determines, based on a network condition, one or more radio resources available for the electronic device to perform the uplink data transmission, and determines, based on the determined one or more radio resources, a first time period indicative of a first time window where no radio resource is available for the uplink data transmission requested by the electronic device 300. The wireless communication network node 400 transmits a signalling message 602 to the electronic device 300, wherein the signalling message 602 is indicative of the first time period. The first time period may be indicative of a first time window that the wireless communication device 400 assesses as the time window during which the electronic device 300 is not required to monitor a downlink control channel (e.g. e.g. to monitor for uplink scheduling, e.g. for a scheduling grant), e.g. due to the lack of immediate radio resources available for the uplink data transmission.

Optionally, the signalling message 602 is in itself indicative of the first time period and/or a second time period, e.g. without having a specific field included in the signalling message, and upon receipt of the signalling message, the electronic device 300 is configured to act according to the present disclosure.

Optionally, the signalling message 602 comprises a first time period parameter, the first time period parameter being indicative of the first time period.

Optionally, the signalling message 602 comprises a first indicator for indicating to the electronic device 300 to retrieve the first time period.

Optionally, the signalling message 602 comprises a second time period parameter, the second time period parameter being indicative of the second time period.

Optionally, the signalling message 602 comprises a second indicator for indicating to the electronic device 300 to retrieve the second time period.

Optionally, the signalling message 602 is a scheduling grant, from the wireless communication network node 400, adapted to be indicative of the first time period, such as the scheduling grant comprising a first indicator for informing the electronic device 300 to retrieve the first time period and/or a first time period parameter indicative of the first time period.

In one or more exemplary embodiments, the signalling message 602 is a scheduling grant indicative of the first time period, the electronic device 300 may at least partly stop the monitoring of the downlink control channel until expiry of the first time period. Upon expiry of the first time period, the electronic device 300 monitors the downlink control channel and/or transmits an uplink data message 604 to the wireless communication network node 400 according to the received scheduling grant.

In one or more exemplary embodiments, the signalling message 602 is not a scheduling grant indicative of the first time period, the electronic device 300 may at least partly stop the monitoring of the downlink control channel until expiry of the first time period. Upon expiry of the first time period, the electronic device 300 monitors the downlink control channel for receiving a scheduling grant 603 indicative of one or more allocated radio resources for the uplink data transmission, receives the scheduling grant 603 and transmits an uplink data message 604 to the wireless communication network node 400 according to the received scheduling grant 603.

Figure 6B:
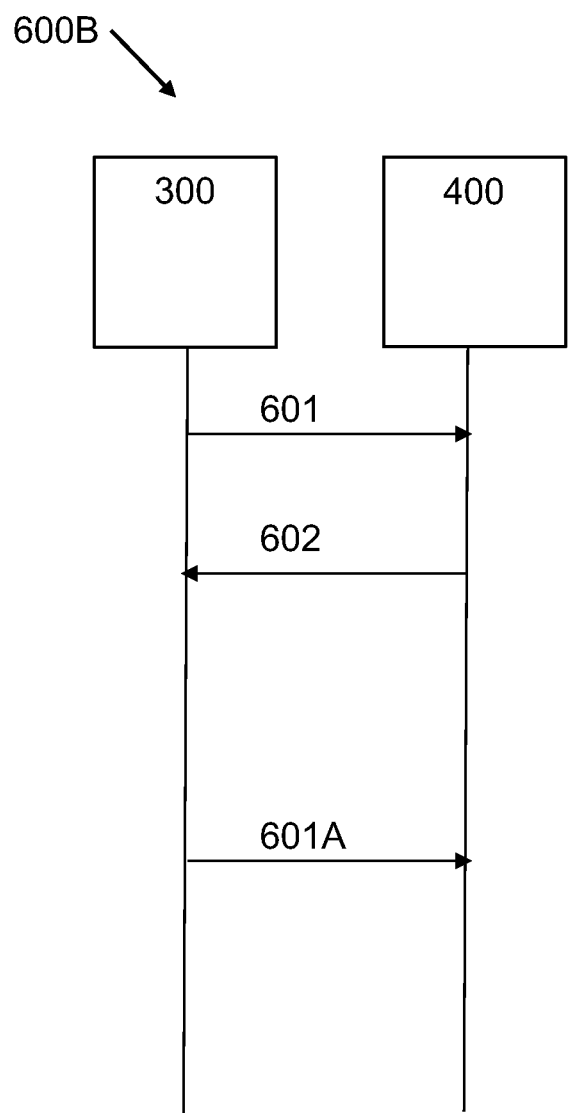

Signaling diagram 600B of FIG. 6B shows that the electronic device 300 transmits to the wireless communication network 400 a scheduling request 601.

Upon reception of the scheduling request, the wireless communication network node 400 determines, based on a network condition, one or more radio resources available for the electronic device to perform the uplink data transmission, and determines, based on the determined one or more radio resources, a first time period indicative of a first time window where no radio resource is available for the uplink data transmission requested by the electronic device 300. The wireless communication network node 400 transmits a signalling message 602 to the electronic device 300, wherein the signalling message 602 is indicative of the first time period.

Optionally, the signalling message 602 is in itself indicative of the first time period and/or a second time period, e.g. without having a specific field included in the signalling message, and upon receipt of the signalling message, the electronic device 300 is configured to act according to the present disclosure.

Optionally, the signalling message 602 comprises a first time period parameter, the first time period parameter being indicative of the first time period.

Optionally, the signalling message 602 comprises a first indicator for indicating to the electronic device to retrieve the first time period.

Optionally, the signalling message 602 comprises a second time period parameter, the second time period parameter being indicative of the second time period.

Optionally, the signalling message 602 comprises a second indicator for indicating to the electronic device to retrieve the second time period.

Upon expiry of the first time period, the electronic device 300 monitors the downlink control channel for signalling regarding the uplink data transmission.

Upon expiry of the second time period, if the electronic device 300 determines that no scheduling grant is received from the wireless communication device 400 (e.g. before expiry of the second time period, or during the second time period), the electronic device 300 retransmits the scheduling request or transmits a new scheduling request 601A to the wireless communication network node 400.

Figure 6C:
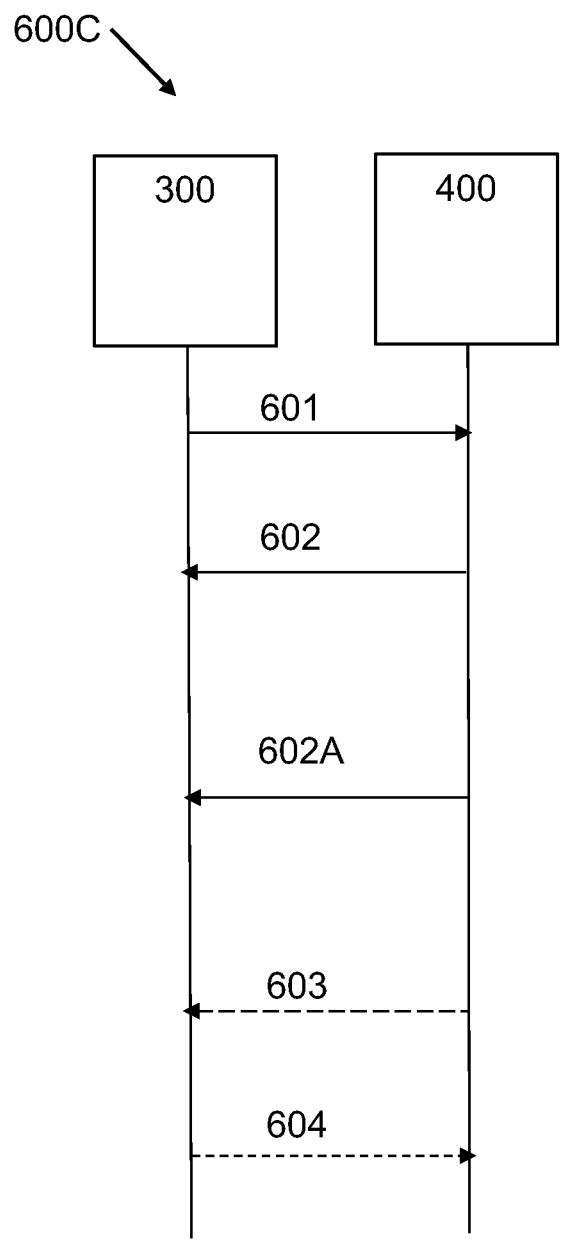

Signaling diagram 600C of FIG. 6C shows that the electronic device 300 transmits to the wireless communication network 400 a scheduling request 601. Upon reception of the scheduling request 601, the wireless communication network node 400 determines, based on a network condition, one or more radio resources available for the electronic device to perform the uplink data transmission, and determines, based on the determined one or more radio resources, a first time period indicative of a first time window where no radio resource is available for the uplink data transmission requested by the electronic device 300. The wireless communication network node 400 transmits a signalling message 602 to the electronic device 300, wherein the signalling message 602 is indicative of the first time period and a second time period.

Optionally, the signalling message 602 is in itself indicative of the first time period and a second time period, e.g. without having a specific field included in the signalling message, and upon receipt of the signalling message, the electronic device 300 is configured to act according to the present disclosure.

Optionally, the signalling message 602 comprises a first time period parameter and a second time period parameter, the first time period parameter being indicative of the first time period, the second time period parameter being indicative of the second time period. Optionally, the signalling message 602 comprises a first indicator for indicating to the electronic device to retrieve the first time period and a second indicator for indicating to the electronic device 300 to retrieve the second time period.

In one or more exemplary embodiments, the electronic device 300 may at least partly stop the monitoring of the downlink control channel until expiry of the first time period. Upon expiry of the first time period, the electronic device 300 monitors the downlink control channel and receives an additional signalling message 602A indicative of a first time period. In this example, the electronic device 300 proceeds then to at least partly stop the monitoring of the downlink control channel until expiry of the first time period again; and upon expiry of the first time period, the electronic device 300 ceases to at least partly stop the monitoring of the downlink control channel. When the electronic device 300, while monitoring, receives a scheduling grant 603 from the wireless communication network node 400, the electronic device 300 transmit an uplink data message 604 according to the scheduling grant 603 to the wireless communication network node 400.

Figure 6D:
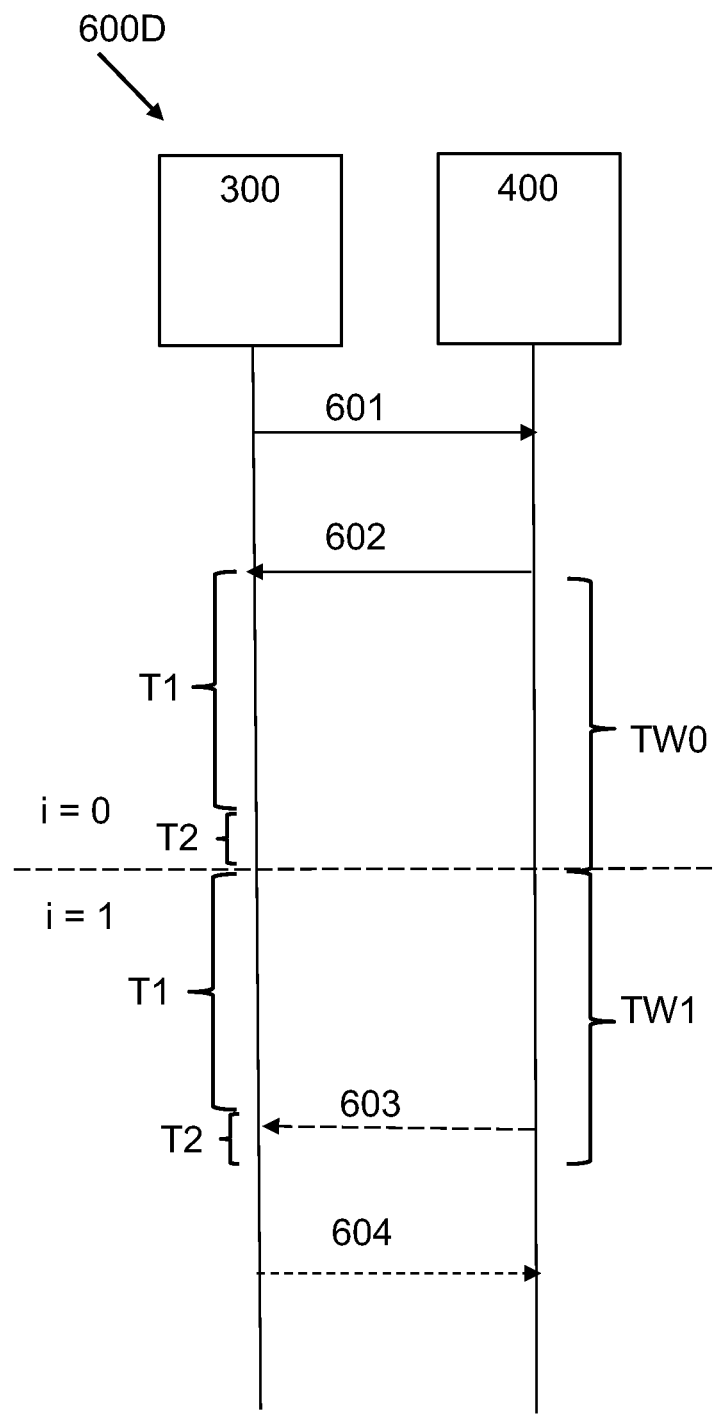

Signaling diagram 600D of FIG. 6D shows that the electronic device 300 transmits to the wireless communication network 400 a scheduling request 601. Upon reception of the scheduling request 601, the wireless communication network node 400 determines, based on a network condition, one or more radio resources available for the electronic device 300 to perform the uplink data transmission, and determines, based on the determined one or more radio resources, a first time period T1 where no radio resource is available for the uplink data transmission requested by the electronic device 300. The wireless communication network node 400 transmits a signalling message 602 to the electronic device 300, wherein the signalling message 602 is indicative of the first time period T1, a second time period T2, and a maximum repetition number N of a processing time window. A processing time window includes a first time period T1 and a second time period T2.

Optionally, the signalling message 602 is in itself indicative of the first time period and a second time period and N, e.g. without having a specific field included in the signalling message, and upon receipt of the signalling message, the electronic device 300 is configured to act according to the present disclosure.

Optionally, the signalling message 602 comprises a first time period parameter and a second time period parameter and a maximum repetition parameter, the first time period parameter being indicative of the first time period, the second time period parameter being indicative of the second time period, the maximum repetition parameter being indicative of N. Optionally, the signalling message 602 comprises a first indicator for indicating to the electronic device to retrieve the first time period, a second indicator for indicating to the electronic device 300 to retrieve the second time period, and a third indicator for indicating to the electronic device 300 to retrieve N.

In one or more exemplary embodiments, the electronic device 300 may at least partly stop the monitoring of the downlink control channel until expiry of the first time period T1 of the first processing time window TW0 and initializes a counter i to zero. The counter i relates to the number of repetitions of the determination (e.g. of the processing time window in addition to TW0). Upon expiry of the first time period T1, the electronic device 300 monitors the downlink control channel and does not receive any signalling message related to the scheduling request 601 from the wireless communication device 400 during the second time period T2. In this example, upon expiry of T2, and because no signalling message related to the scheduling request 601 from the wireless communication device 400 has been received during the second time period T2, the electronic device 300 increments the counter i by 1: i=1 and determines whether the counter is equal or less than N. When it is determined by the electronic device 300 that the counter is equal or less than N, the electronic device 300 proceeds to a second time processing window TW1. During T1 of TW1, the electronic device 300 at least partly stops the monitoring of the downlink control channel until expiry of the first time period T1 of TW1. The electronic device 300 determines whether the first time period of TW1 has expired, and upon determination on the expiry of the first time period of TW1, the electronic device 300 ceases to at least partly stop the monitoring of the downlink control channel. When the electronic device 300, while monitoring, receives a scheduling grant 603 from the wireless communication network node 400 during T2 of TW1, the electronic device 300 transmit an uplink data message 604 according to the scheduling grant 603 to the wireless communication network node 400.

The present disclosure provides electronic devices, wireless communication network nodes, systems, methods and products according to the following items:

Item 1. A method, performed by an electronic device, for an uplink data transmission, wherein the electronic device is configured to communicate with a wireless communication network node, the method comprising:
    transmitting a scheduling request for the uplink data transmission to the wireless communication network node; and
    receiving a signalling message from the wireless communication network node, wherein the signalling message is indicative of a first time period during which the electronic device is not required to monitor a downlink control channel with the wireless communication network node.

Item 2. The method according to item 1, the method comprising:
    obtaining the first time period according to the received signalling message.

Item 3. The method according to any of the preceding items, the method comprising:
    determining whether the first time period has expired; and
    in accordance with a determination that the first time period has not expired:
    at least partly stopping a monitoring of the downlink control channel.

Item 4. The method according to item 3, the method comprising:
    in accordance with a determination that the first time period has expired:
    monitoring the downlink control channel.

Item 5. The method according to any of items 3-4, the method comprising:
    in accordance with a determination that the first time period has expired:
    transmitting an uplink data message to the wireless communication network node.

Item 6. The method according to any of items 3-5, the method comprising:
    in accordance with the determination that the first time period has not expired, forgoing a retransmission of the scheduling request to the wireless communication network node in response to receiving the signalling message.

Item 7. The method according to any of items 3-6, the method comprising: in accordance with the determination that the first time period has expired, receiving a scheduling grant from the wireless communication network node.

Item 8. The method according to any of items 1-6, wherein receiving the signalling message from the wireless communication network node comprises receiving a scheduling grant from the wireless communication network node, the scheduling grant being indicative of the first time period.

Item 9. The method according to any of items 7-8, wherein transmitting an uplink data message to the wireless communication network node is performed according to the received scheduling grant.

Item 10. The method according to any of items 1-7 and 9, wherein the signalling message is indicative of a second time period after which the electronic device is permitted to retransmit the scheduling request.

Item 11. The method according to any of items 1-7 and 9-10, the method comprising: obtaining, according to the received signalling message, the second time period after which the electronic device is permitted to retransmit the scheduling request.

Item 12. The method according to item 11, the method comprising:
    determining whether the second time period has expired.

Item 13. The method according to item 12, the method comprising:
    in accordance with a determination that the second time period has not expired:
    monitoring the downlink control channel,
    determining whether the scheduling grant is received by the electronic device during the second time period.

Item 14. The method according to any of items 12-13, the method comprising:
    in accordance with a determination that the second time period has expired and in accordance with a determination that the scheduling grant has not been received before expiry of the second time period:
        performing the retransmission of the scheduling request to the wireless communication network node.

Item 15. The method according to any of items 12-13, the method comprising:
    obtaining, according to the signalling message, a maximum repetition number N for the first time period and/or the second time period;
    in accordance with a determination that the second time period has expired,
        in accordance with a determination that the scheduling grant has not been received before expiry the second time period and while the maximum repetition number N is not reached:
        determining whether the first time period and/or the second time period have expired.

Item 16. The method according to any of items 11-15, wherein obtaining, according to the received signalling message, the first time period and/or the second time period comprises receiving from the wireless communication network node the signalling message comprising a first time period parameter and/or a second time period parameter, the first time period parameter being indicative of the first time period, and the second time period parameter being indicative of the second time period.

Item 17. The method according to any of items 11-16, wherein obtaining, according to the received signalling message, the first time period and/or the second time period comprises:
    receiving from the wireless communication network node the signalling message comprising a first indicator and/or a second indicator for respectively indicating to the electronic device to retrieve the first time period and/or the second time period, and
    retrieving the first time period and/or the second time period.

Item 18. The method according to any of the preceding items, wherein the signalling message is indicative of a receipt of the scheduling request at the wireless communication network node.

Item 19. A method, performed by a wireless communication network node, for adapting a scheduling of an uplink data transmission, wherein the wireless communication network node is configured to communicate with an electronic device, the method comprising:
    receiving a scheduling request for an uplink data transmission from the electronic device,
    determining, based on a network condition, one or more radio resources available for the uplink data transmission, determining, based on the determined one or more radio resources, a first time period indicative of a first time window where no radio resource is available for the uplink data transmission requested by the electronic device, and transmitting a signalling message to the electronic device, wherein the signalling message is indicative of the first time period.

Item 20. The method according to item 19, wherein the scheduling request comprises an identifier of a class of quality of service for the uplink data transmission, and wherein determining, based on the network condition, the one or more radio resources available for the uplink data transmission comprises determining, based on the network condition and on the identifier, the one or more radio resources available for the uplink data transmission.

Item 21. The method according to any of items 19-20, wherein transmitting the signalling message to the electronic device comprises transmitting to the electronic device the signalling message comprising a first time period parameter indicative of the first time period.

Item 22. The method according to any of items 19-21, wherein transmitting the signalling message to the electronic device comprises transmitting to the electronic device the signalling message comprising a first indicator for informing the electronic device to retrieve the first time period.

Item 23. The method according to any of items 19-22, the method comprising:
determining, based on the determined one or more radio resources, a second time period after which the electronic device is permitted to retransmit the scheduling request.

Item 24. The method according to item 23, wherein the signalling message comprises a second indicator for informing the electronic device to retrieve the second time period and/or a second time period parameter indicative of the second time period.

Item 25. The method according to any of items 19-24, wherein transmitting the signalling message to the electronic device comprises transmitting a scheduling grant to the electronic device, the scheduling grant being indicative of the first time period.

Item 26. The method according to any of items 19-25, the method comprising: in accordance with the determination that the first time period has expired, transmitting a scheduling grant to the electronic device.

Item 27. The method according to any of items 19-26, wherein the signalling message is indicative of a receipt of the scheduling request at the wireless communication network node.

Item 28. An electronic device configured to:
transmit a scheduling request for an uplink data transmission to a wireless communication network node,
receive a signalling message from the wireless communication network node, wherein the signalling message is indicative of a first time period, wherein the first time period is indicative of a first time window during which the electronic device is not required to monitor a downlink control channel.

Item 29. A wireless communication network node configured to:
receive a scheduling request for an uplink data transmission from an electronic device,
determine, based on a network condition, one or more radio resources available for the uplink data transmission,
determine, based on the determined one or more resources, a first time period indicative of a first time window where no radio resource is available for the uplink data transmission requested by the electronic device,
transmit a signalling message to the electronic device, wherein the signalling message is indicative of the first time period.

Item 30. A system comprising:
an electronic device configured to perform any of the methods according to any of items 1-18; and/or
a wireless communication network node configured to perform any of the methods according to any of items 19-28.

Item 31. A computer readable storage medium storing one or more programs, the one or more programs comprising instructions, which when executed by an electronic device cause the electronic device to perform any of the methods of items 1-18.

Item 32. A computer readable storage medium storing one or more programs, the one or more programs comprising instructions, which when executed by a wireless communication network node cause the wireless communication network node to perform any of the methods of items 19-28.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-1C, and FIGS. 2-6E comprises some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed subject matter, and it will be made obvious to those skilled in the art that various changes and modifications may be made without departing from the spirit and scope of the claimed invention. The specification and drawings are, accordingly to be regarded in an illustrative rather than restrictive sense. The claimed subject matter is intended to cover all alternatives, modifications, and equivalents.

The invention claimed is:

1. A method, performed by an electronic device, for an uplink data transmission, wherein the electronic device is configured to communicate with a wireless communication network node, the method comprising:
  transmitting a scheduling request for the uplink data transmission to the wireless communication network node; and
  receiving a signalling message from the wireless communication network node, wherein the signalling message is indicative of a first time period where no radio resource is available for the uplink data transmission requested by the electronic device.

2. The method according to claim 1, wherein the signalling message is indicative of a receipt of the scheduling request at the wireless communication network node.

3. The method according to claim 1, the method comprising:
  obtaining the first time period according to the received signalling message.

4. The method according to claim 1, the method comprising:
  determining whether the first time period has expired; and
  in accordance with a determination that the first time period has not expired:
    at least partly stopping a monitoring of a downlink control channel.

5. The method according to claim 4, the method comprising:
  in accordance with a determination that the first time period has expired:
    monitoring the downlink control channel.

6. The method according to claim 1, the method comprising:
  in accordance with a determination that the first time period has expired:
    transmitting an uplink data message to the wireless communication network node.

7. The method according to claim 1, wherein the receiving the signalling message from the wireless communication network node comprises receiving a scheduling grant from the wireless communication network node, the scheduling grant being indicative of the first time period.

8. The method according to claim 1, the method comprising: obtaining, according to the received signalling message, a second time period after which the electronic device is permitted to retransmit the scheduling request.

9. The method according to claim 8, wherein the obtaining, according to the received signalling message, the first time period or the second time period comprises receiving from the wireless communication network node the signalling message comprising a first time period parameter or a second time period parameter, the first time period parameter being indicative of the first time period, and the second time period parameter being indicative of the second time period.

10. The method according to claim 8, wherein the obtaining, according to the received signalling message, the first time period or the second time period comprises:
  receiving from the wireless communication network node the signalling message comprising a first indicator or a second indicator for respectively indicating to the electronic device to retrieve the first time period or the second time period, and
  retrieving the first time period or the second time period.

11. A method, performed by a wireless communication network node, for adapting a scheduling of an uplink data transmission, wherein the wireless communication network node is configured to communicate with an electronic device, the method comprising:
  receiving a scheduling request for an uplink data transmission from the electronic device;
  determining, based on a network condition, one or more radio resources available for the uplink data transmission;
  determining, based on the determined one or more radio resources, a first time period indicative of a first time window where no radio resource is available for the uplink data transmission requested by the electronic device; and
  transmitting a signalling message to the electronic device, wherein the signalling message is indicative of the first time period.

12. The method according to claim 11, wherein the scheduling request comprises an identifier of a class of quality of service for the uplink data transmission, and wherein the determining, based on the network condition, the one or more radio resources available for the uplink data transmission comprises determining, based on the network condition and on the identifier, the one or more radio resources available for the uplink data transmission.

13. The method according to claim 11, wherein the transmitting the signalling message to the electronic device comprises transmitting to the electronic device the signalling message comprising a first time period parameter indicative of the first time period.

14. The method according to claim 11, wherein the transmitting the signalling message to the electronic device comprises transmitting to the electronic device the signalling message comprising a first indicator for informing the electronic device to retrieve the first time period.

15. The method according to claim 11, the method comprising:

determining, based on the determined one or more radio resources, a second time period after which the electronic device is permitted to retransmit the scheduling request.

16. The method according to claim 15, wherein the signalling message comprises a second indicator for informing the electronic device to retrieve the second time period or a second time period parameter indicative of the second time period.

17. The method according to claim 11, wherein the transmitting the signalling message to the electronic device comprises transmitting a scheduling grant to the electronic device, the scheduling grant being indicative of the first time period.

18. The method according to claim 11, the method comprising: in accordance with a determination that the first time period has expired, transmitting a scheduling grant to the electronic device.

19. A wireless communication network node comprising a memory module, an interface and a processor module, wherein the wireless communication network node is configured to:
receive a scheduling request for an uplink data transmission from an electronic device;
determine, based on a network condition, one or more radio resources available for the uplink data transmission;
determine, based on the determined one or more resources, a first time period indicative of a first time window where no radio resource is available for the uplink data transmission requested by the electronic device; and
transmit a signalling message to the electronic device, wherein the signalling message is indicative of the first time period.

* * * * *